(12) United States Patent
Tang et al.

(10) Patent No.: US 11,737,100 B2
(45) Date of Patent: *Aug. 22, 2023

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 104 days.

This patent is subject to a terminal disclaimer.

(21) Appl. No.: 17/308,614

(22) Filed: May 5, 2021

(65) Prior Publication Data

US 2021/0258995 A1    Aug. 19, 2021

Related U.S. Application Data

(63) Continuation of application No. 16/344,707, filed as application No. PCT/CN2016/104352 on Nov. 2, 2016, now Pat. No. 11,026,252.

(51) Int. Cl.
*H04W 72/00* (2023.01)
*H04W 72/21* (2023.01)
(Continued)

(52) U.S. Cl.
CPC .............. *H04W 72/21* (2023.01); *H04L 1/00* (2013.01); *H04L 5/0044* (2013.01);
(Continued)

(58) Field of Classification Search
CPC ............. H04W 72/1284; H04W 72/10; H04W 72/1289; H04W 72/1242; H04W 72/1205;
(Continued)

(56) References Cited

U.S. PATENT DOCUMENTS 11,026,252 B2 * 6/2021 Tang ................. H04W 72/1242
2010/0067591 A1   3/2010 Luo et al.
(Continued)

FOREIGN PATENT DOCUMENTS

CN   102237959 A   11/2011
CN   102546531 A   7/2012
(Continued)

OTHER PUBLICATIONS

Chinese Second Office Action with English Translation for CN Application 201680090471.3 dated Jul. 12, 2021. (14 pages).
(Continued)

*Primary Examiner* — Steven H Nguyen (74) *Attorney, Agent, or Firm* — Young Basile Hanlon & MacFarlane, P.C.

(57) ABSTRACT

A communication method, a terminal device and a network device are provided. The method includes: a terminal device receives first indication information sent by a network device, wherein the first indication information is used for scheduling first uplink transmission of the terminal device; the terminal device receives a physical-layer signaling sent by the network device, wherein the physical-layer signaling is used for instructing the terminal device to abandon or suspend the first uplink transmission, or the physical-layer signaling is used for modifying a configuration parameter of the first uplink transmission; and the terminal device performs processing on the first uplink transmission according to the physical-layer signaling.

17 Claims, 3 Drawing Sheets

(51) Int. Cl.
  *H04L 5/00* (2006.01)
  *H04L 1/00* (2006.01)
  *H04W 72/56* (2023.01)

(52) U.S. Cl.
  CPC .......... *H04L 5/0053* (2013.01); *H04L 5/0064* (2013.01); *H04L 5/0091* (2013.01); *H04L 5/0094* (2013.01); *H04W 72/56* (2023.01)

(58) Field of Classification Search
  CPC ....... H04L 1/00; H04L 5/0044; H04L 5/0053; H04L 5/0064; H04L 5/0091; H04L 5/0094; H04L 1/0023; H04L 1/0039
  See application file for complete search history.

(56) References Cited

U.S. PATENT DOCUMENTS

| | | | | |
|---|---|---|---|---|
| 2015/0223232 | A1* | 8/2015 | Eriksson | H04W 28/065 370/329 |
| 2016/0249333 | A1 | 8/2016 | Freda et al. | |
| 2016/0295516 | A1 | 10/2016 | Su et al. | |
| 2017/0150367 | A1* | 5/2017 | Han | H04L 5/001 |

FOREIGN PATENT DOCUMENTS

| | | | |
|---|---|---|---|
| CN | 103906134 | A | 7/2014 |
| CN | 103988455 | A | 8/2014 |
| CN | 104104486 | A | 10/2014 |
| CN | 105101388 | A | 11/2015 |
| CN | 105900522 | A | 8/2016 |
| CN | 105939540 | A | 9/2016 |
| EP | 1180907 | A2 | 2/2002 |
| GB | 2524597 | A | 9/2015 |
| JP | 2013510539 | A | 3/2013 |
| JP | 2015505436 | A | 2/2015 |
| JP | 2016532370 | A | 10/2016 |
| KR | 20140016957 | A | 2/2014 |
| WO | 2015113612 | A1 | 8/2015 |

OTHER PUBLICATIONS

Extended European Search Report for EP Application 21177712.3 dated Aug. 16, 2021. (6 pages).
Japanese Office Action with English Translation for JP Application 2019-521381 dated Jul. 30, 2021. (7 pages).
Taiwan Office Action with English Translation for TW Application 106137628 dated Jun. 16, 2021. (12 pages).
Extended EP Search Report for EP 16920521.8 dated Oct. 28, 2019.
3GPP TSG RAN WG2 Meeting #91bis; R2-15421; Malmo, Sweden, Oct. 5-9, 2015; 5 pages.
3GPP TSG RAN WG2 Meeting #93bis; R2-162735; Dubrovnik, Croatia, Apr. 11-15, 2016; 7 pages.
Communication pursuant to Article 94(3) Examination of EP Application 16920521.8 dated Jul. 17, 2020.
Japanese Office Action with English Translation for JP Application 2019-521381 dated Oct. 27, 2020.
India First Examination Report 201917020284 dated Jan. 13, 2021.
China First Office Action with English translation for CN Application 201680090471.3 dated Jan. 27, 2021. (26 pages).
Chinese Office Action with English Translation for CN Application 201680090471.3 dated Oct. 9, 2021. (9 pages).
Japanese Decision of Rejection with English Translation for JP Application 2019521381 dated Mar. 4, 2022. (7 pages).
Japanese Reconsideration Examination Report with English Translation for JP Application 2019521381 dated Sep. 28, 2022. (5 pages).
Japanese Notice of Termination of Reconsideration with English Translation for JP Application 2019521381 dated Oct. 4, 2022. (2 pages).
Japanese Notice of Reasons for Refusal with English Translation for JP Application 2019521381 dated Dec. 23. 2022. (04 pages).
Korean Office Action with English Translation for KR Application 1020197014824 dated Jan. 26, 2023. (10 pages).
3GPP TSG RAN WG1 Meeting #86, Gothenburg, Sweden, R1-167019, Nokia, Alcatel-Lucent Shanghai Bell, Simultaneous Transmissions of UL Signals for Shortened TTI Operation, Aug. 22-26, 2016. (5 pages).
Communication pursuant to Article 94(3) EPC for EP Application 21177712.3 dated May 25, 2023. (6 pages).
Japanese Notice of Reasons for Refusal with English Translation for JP Application 2022108043 dated May 23, 2023. (6 pages).

* cited by examiner

United States Patent US 11,737,100 B2

COMMUNICATION METHOD, TERMINAL DEVICE AND NETWORK DEVICE

CROSS-REFERENCE TO RELATED APPLICATION(S)

This application is a continuation application of U.S. application Ser. No. 16/344,707, filed on Apr. 24, 2019, which is a 371 of International Application No. PCT/CN2016/104352, filed on Nov. 2, 2016. The entire contents of the above-identified applications are incorporated herein by reference.

TECHNICAL FIELD

Embodiments of the present disclosure relates to the communication field, and more particularly, to a communication method, a terminal device, and a network device.

BACKGROUND

In existing mobile communication systems, after a base station allocates uplink transmission resources to a terminal device, the terminal device needs certain processing time to complete uplink transmission. For example, in a Long Term Evolution (LTE) system, if a base station allocates uplink transmission resources to a terminal device in a subframe n, the terminal device will use the allocated uplink transmission resources in a subframe n+4 to perform uplink transmission. In the LTE system, a duration of one subframe is 1 ms, and correspondingly, the processing time of the terminal device is 3 ms.

However, it is possible that after the base station schedules uplink transmission of the terminal device, it is found that the current uplink scheduling is not appropriate due to some reasons. For example, after the base station makes the uplink scheduling of the terminal device, high-priority burst services are discovered, and these burst services conflict with the uplink scheduling that the base station has made. In this case, the base station will prioritize high-priority services, and if the terminal device continues to perform the original uplink scheduling, there will be a risk of packet loss, which causes poor user experience.

SUMMARY

Embodiments of the present disclosure provide a communication method, a terminal device, a network device and a wireless communication system. In a first aspect, a communication method is provided. The method includes: a terminal device receives first indication information sent by a network device, and the first indication information is used for scheduling first uplink transmission of the terminal device; the terminal device receives a physical-layer signaling sent by the network device, and the physical-layer signaling is used for instructing the terminal device to abandon or suspend the first uplink transmission, or the physical-layer signaling is used for modifying a configuration parameter of the first uplink transmission; and the terminal device performs processing on the first uplink transmission according to the physical-layer signaling.

The physical-layer signaling may cancel, suspend, or modify the scheduling of the first uplink transmission.

In a first possible implementation of the first aspect, performing, by the terminal device, the processing on the first uplink transmission according to the physical-layer signaling includes: if the terminal device has not completed the first uplink transmission when receiving the physical-layer signaling, the terminal device performs the processing on the first uplink transmission according to the physical-layer signaling.

Optionally, that the terminal device has not completed the first uplink transmission may refer to that the first uplink transmission is not started, or the first uplink transmission is started but data or information corresponding to the first uplink transmission is not sent.

In combination with the above possible implementation of the first aspect, in a second possible implementation of the first aspect, the method further includes: if the terminal device has completed the first uplink transmission when receiving the physical-layer signaling, the terminal device discards the physical-layer signaling.

In combination with the above possible implementations of the first aspect, in a third possible implementation of the first aspect, the physical-layer signaling is used for instructing the terminal device to suspend the first uplink transmission; and after the terminal device performs the processing on the first uplink transmission according to the physical-layer signaling, the method further includes: the terminal device receives second indication information sent by the network device, and the second indication information is used for instructing the terminal device to abandon the first uplink transmission or continue to perform the first uplink transmission, or instructing the terminal device to adopt a new configuration parameter to perform the first uplink transmission; and the terminal device performs processing on the first uplink transmission according to the second indication information.

In combination with the above possible implementations of the first aspect, in a fourth possible implementation of the first aspect, the method further includes: when determining that the physical-layer signaling is used for instructing the terminal device to suspend the first uplink transmission, the terminal device starts a timer; and receiving, by the terminal device, the second indication information sent by the network device includes: the terminal device receives the second indication information sent by the network device before the timer expires.

Optionally, if the terminal device determines that the physical-layer signaling is used for instructing the terminal device to suspend the first uplink transmission, the terminal device may start a timer specified in a protocol or preconfigured by the network device, and detect the indication sent by the network device before the timer expires.

In combination with the above possible implementations of the first aspect, in a fifth possible implementation of the first aspect, the method further includes: if the second indication information sent by the network device is not received before the timer expires, the terminal device abandons the first uplink transmission.

In connection with the above possible implementations of the first aspect, in a sixth possible implementation of the first aspect, the physical-layer signaling is specifically used for modifying at least one of following configuration parameters of the first uplink transmission: a waveform, a transmission resource, a Modulation Coding Scheme (MCS), and a parameter for beamforming.

In combination with the above possible implementations of the first aspect, in a seventh possible implementation of the first aspect, before the terminal device receives the physical-layer signaling sent by the network device, the method further includes: if the physical-layer signaling is specifically used for modifying a waveform of the first uplink transmission, the terminal device receives a high-layer signaling sent by the network device, and the high-layer signaling carries a configuration parameter corresponding to each of at least two selectable uplink waveforms supported by the terminal device, and the at least two selectable uplink waveforms include a modified waveform of the first uplink transmission; the physical-layer signaling includes a configuration parameter corresponding to the modified waveform carried by the high-layer signaling. After the terminal device receives the physical-layer signaling sent by the network device, the method further includes: the terminal device determines to adopt the modified waveform to perform the first uplink transmission according to the configuration parameter carried by the physical-layer signaling.

In combination with the above possible implementations of the first aspect, in an eighth possible implementation of the first aspect, receiving, by the terminal device, the physical-layer signaling sent by the network device includes: the terminal device receives the physical-layer signaling sent by the network device when the network device determines that an uplink transmission waveform of the terminal device needs to be modified.

In combination with the above possible implementations of the first aspect, in a ninth possible implementation of the first aspect, the first uplink transmission includes at least one of following transmissions: transmission on a physical uplink shared channel (PUSCH), transmission of an uplink reference signal, and transmission on a physical uplink control channel (PUCCH).

In combination with the above possible implementations of the first aspect, in a tenth possible implementation of the first aspect, when the first uplink transmission includes the transmission on the PUSCH, the first indication information includes an uplink transmission number corresponding to the first uplink transmission; and the physical-layer signaling carries the uplink transmission number corresponding to the first uplink transmission. After the terminal device receives the physical-layer signaling sent by the network device, the method further includes: the terminal device determines that the physical-layer signaling corresponds to the first uplink transmission according to the uplink transmission number carried by the physical-layer signaling.

In combination with the above possible implementations of the first aspect, in an eleventh possible implementation of the first aspect, the physical-layer signaling is further used for scheduling second uplink transmission of the terminal device. The method further includes: the second uplink transmission is performed according to the physical-layer signaling.

In a second aspect, another communication method is provided. The method includes: a network device sends first indication information to a terminal device, and the first indication information is used for scheduling first uplink transmission of the terminal device; the network device sends a physical-layer signaling to the terminal device, and the physical-layer signaling is used for instructing the terminal device to abandon or suspend the first uplink transmission, or the physical-layer signaling is used for modifying a configuration parameter of the first uplink transmission.

In a first possible implementation of the second aspect, after the network device sends the physical-layer signaling to the terminal device, the method further includes: the network device performs detection on a transmission resource scheduled by the first indication information; and when an uplink transmission is detected on the transmission resource, the network device performs demodulation processing on the detected uplink transmission.

In combination with the above possible implementation of the second aspect, in a second possible implementation of the second aspect, the physical-layer signaling is used for instructing the terminal device to suspend the first uplink transmission. After the network device sends the physical-layer signaling to the terminal device, the method further includes: the network device sends second indication information to the terminal device, and the second indication information is used for instructing the terminal device to abandon the first uplink transmission or continue the first uplink transmission, or instructing the terminal device to adopt a modified configuration parameter to perform the first uplink transmission.

In combination with the above possible implementations of the second aspect, in a third possible implementation of the second aspect, before the network device sends the second indication information to the terminal device, the method further includes: the network device sends third indication information to the terminal device, and the third indication information is used for configuring a timer for suspension of the first uplink transmission of the terminal device; sending, by the network device, the second indication information to the terminal device includes: the network device sends the second indication information to the terminal device before the timer expires.

In connection with the above possible implementations of the second aspect, in a fourth possible implementation of the second aspect, the physical-layer signaling is specifically used for modifying at least one of following configuration parameters of the first uplink transmission: a waveform, a transmission resource, a MCS, and a parameter for beamforming.

In combination with the above possible implementations of the second aspect, in a fifth possible implementation of the second aspect, before the network device sends the physical-layer signaling to the terminal device, the method further includes: when the physical-layer signaling is specifically used for modifying a waveform of the first uplink transmission, the network device sends a high-layer signaling to the terminal device, and the high-layer signaling carries a configuration parameter corresponding to each of at least two selectable uplink waveforms supported by the terminal device, and the at least two selectable waveforms include a modified waveform of the first uplink transmission. The physical-layer signaling includes a configuration parameter corresponding to the modified waveform carried by the high-layer signaling.

In combination with the above possible implementations of the second aspect, in a sixth possible implementation of the second aspect, sending, by the network device, the physical-layer signaling to the terminal device includes: when determining that an uplink transmission waveform of the terminal device needs to be modified, the network device sends the physical-layer signaling to the terminal device.

Optionally, before the network device sends the physical-layer signaling to the terminal device, the method further includes: the network device measures an uplink reference signal sent by the terminal device; and the network device determines an uplink transmission waveform of the terminal device according to a result of the measurement.

Optionally, sending, by the network device, the physical-layer signaling to the terminal device includes: when the determined uplink transmission waveform is different from a current uplink transmission waveform of the terminal device, the network device sends the physical-layer signaling to the terminal device.

In combination with the above possible implementations of the second aspect, in a seventh possible implementation of the second aspect, the first uplink transmission includes at least one of: transmission on a PUSCH, transmission of an uplink reference signal transmission, and transmission on a PUCCH.

In combination with the above possible implementations of the second aspect, in an eighth possible implementation of the second aspect, when the first uplink transmission includes the transmission on the PUSCH, the first indication information includes an uplink transmission number corresponding to the first uplink transmission; and the physical-layer signaling carries the uplink transmission number corresponding to the first uplink transmission.

In combination with the above possible implementations of the second aspect, in a ninth possible implementation of the second aspect, the physical-layer signaling is further used for scheduling second uplink transmission of the terminal device.

In a third aspect, a terminal device for performing the method in the above first aspect or any one of the possible implementations of the first aspect is provided.

Specifically, the terminal device includes units for performing the method in the above first aspect or any one possible implementations of the first aspect.

In a fourth aspect, a network device for performing the method in the above second aspect or any one of the possible implementations of the second aspect.

Specifically, the network device includes units for performing the method in the above second aspect or any one of the possible implementations of the second aspect.

In a fifth aspect, another terminal device is provided. The terminal device includes a storage and a processor. The storage is used for storing instructions, and the processor is used for executing instructions stored in the storage, and when the processor executes the instructions stored in the storage, the execution causes the processor to perform the method in the above first aspect or any one of the possible implementations of the first aspect.

In a sixth aspect, another network device is provided. The network device includes a storage and a processor. The storage is used for storing instructions, and the processor is used for executing instructions stored in the storage, and when the processor executes the instructions stored in the storage, the execution causes the processor to perform the method in the above second aspect or any one of the possible implementations of the second aspect.

In a seventh aspect, a computer readable medium for storing a computer program is provided. The computer program includes instructions for performing the method in the above first aspect or any one of the possible implementations of the first aspect.

In an eighth aspect, a computer readable medium for storing a computer program is provided. The computer program includes instructions for performing the method in the above second aspect or any one of the possible implementations of the second aspect.

DETAILED DESCRIPTION

The technical solutions in the embodiments of the present disclosure will be described below with reference to the drawings in the embodiments of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

Figure 1:
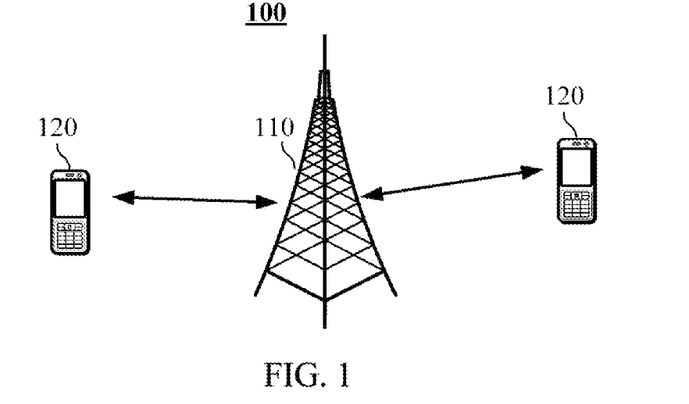
FIG. 1 is a schematic diagram of a wireless communication system according an embodiment of the present disclosure.

FIG. 1 shows a wireless communication system 100 applied in an embodiment of the present disclosure. The wireless communication system 100 may include a network device 110. The network device 100 may be a device that communicates with a terminal device. The network device 100 may provide communication coverage for a specific geographical area, and may communicate with terminal devices (e.g., UE) located within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, an on-board device, or a wearable device, a network device in a future 5G network, or a network device in a future evolved Public Land Mobile Network (PLMN), etc.

The wireless communication system 100 also includes at least one terminal device 120 located within the coverage area of the network device 110. The terminal device 120 may be mobile or fixed. Optionally, the terminal device 120 may be referred to an access terminal, a user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, an on-board device, a wearable device, a terminal device in a future 5G network, or a terminal device in a future evolving Public Land Mobile Network (PLMN), or the like.

FIG. 1 exemplifies one network device and two terminal devices. Optionally, the wireless communication system 100 may include a plurality of network devices, and there may be another quantity of terminal devices within the coverage area of each network device, which is not limited by the embodiments of the present disclosure.

Optionally, the wireless communication system 100 may also include other network entities such as a network controller, a mobile management entity, and embodiments of the present disclosure are not limited thereto.

In addition, the terms "system" and "network" may be often used interchangeably herein. The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

Figure 2:
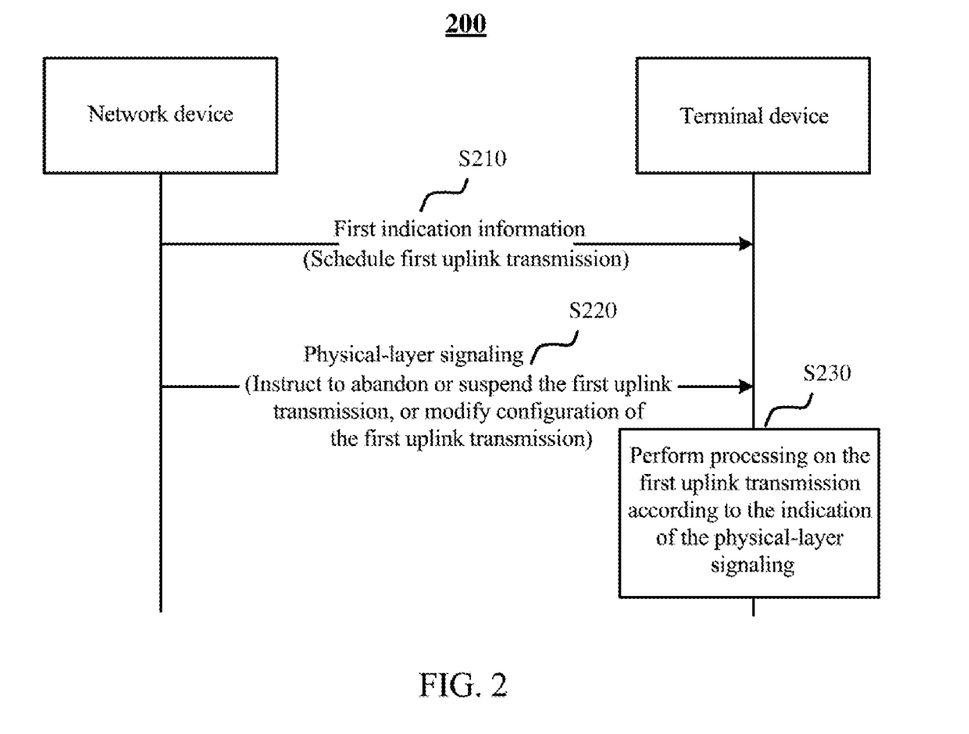
FIG. 2 is a schematic flowchart of a communication method according to an embodiment of the present disclosure.

FIG. 2 is a schematic flowchart of a communication method 200 according to an embodiment of the present disclosure.

In S210, a network device sends first indication information to a terminal device, and the first indication information is used for scheduling first uplink transmission of the terminal device.

As an optional embodiment, the first uplink transmission may include transmission on a physical uplink shared channel (PUSCH), for example, transmission of uplink data. The network device may actively send the first indication information to the terminal device, or may send the first indication information to the terminal device upon receiving a scheduling request of the terminal device. For example, the first indication information may specifically be uplink (UL) grant, and the UL grant is used for scheduling transmission of uplink data of the terminal device. Optionally, the first indication information may include a Hybrid Automatic Repeat Request (HARQ) process number of the first uplink transmission, or the network device may introduce another identifier different from the HARQ process number into the first indication information to identify the uplink scheduling. For example, the first indication information includes an uplink (UL) process number of the first uplink transmission, and the UL process number may be used for retransmission, cancellation, suspension, and/or configuration modification of the first uplink transmission, etc., and embodiments of the present disclosure are not limited thereto.

As another optional embodiment, the first uplink transmission may include transmission of an uplink reference signal, such as transmission of a sounding reference signal (SRS). The first indication information may be a high-layer signaling, or downlink control information (DCI), which is not limited by the embodiments of the present disclosure.

As another optional embodiment, the first uplink transmission may include transmission on a physical uplink control channel (PUCCH), such as transmission of Acknowledgement/Non-acknowledgement (A/N), or transmission of a channel quality indicator (CQI). The first indication information may explicitly or implicitly schedule the first uplink transmission. For example, the first indication information may include downlink data, i.e., the network device may send downlink data to the terminal device, and the terminal device may feed back to the network device whether the downlink data is successfully received according to a preset protocol. In this case, the sending of the downlink data schedules the A/N transmission of the terminal device. Or, the first indication information may include a downlink reference signal, i.e., the network device may send a downlink reference signal to the terminal device, and the terminal device may feed back to the network device a measurement result of the downlink reference signal according to a preset protocol, and in this case, the transmission of the downlink reference signal schedules the transmission of the CQI or the like, of the terminal device.

As another optional embodiment, the first uplink transmission may include any combination of the PUSCH, the uplink reference signal, and the PUCCH, which is not limited by the embodiments of the present disclosure.

It should be understood that only a few examples are listed above, and embodiments of the present disclosure do not limit the manner in which the network device schedules the uplink transmission of the terminal device through the first indication information.

After receiving the first indication information, the terminal device may adopt a preset or default rule or configuration to perform the uplink transmission. Or, the first indication information may further be used for indicating configuration of the first uplink transmission. Accordingly, the terminal device may perform the first uplink transmission according to the configuration of the first indication information. Optionally, the configuration may include a transmission resource used for the first uplink transmission, including a time-frequency resource, a code resource, etc., or may include a waveform used for the first uplink transmission, such as Orthogonal Frequency Division Multiplexing (OFDM) or Discrete Fourier Transform-spreading-OFDM (DFT-s-OFDM), or may include a transmission parameter, such as, a Modulation and Coding Scheme (MCS) of the first uplink transmission. If beamforming is adopted in the first uplink transmission, the first indication information may also include a parameter for beamforming; or, the first indication information may include any combination of the above parameters, which is not limited by the embodiments of the present disclosure.

It should be understood that just a few examples are listed above, and embodiments of the present disclosure do not limit the specific types of configuration parameters included in the first indication information.

In S220, the network device sends a physical-layer signaling to the terminal device, and the physical-layer signaling is used for instructing the terminal device to abandon or suspend the first uplink transmission, or the physical-layer signaling is used for modifying a configuration parameter of the first uplink transmission.

Specifically, the network device may send a physical-layer signaling to the terminal device when it is found that there is a conflict between a high priority service and the first uplink transmission. Or, if the terminal device supports at least two waveforms for uplink transmission, for example, the terminal device supports uplink transmission based on OFDM and uplink transmission based on DFT-s-OFDM, the network device may send the physical-layer signaling to the terminal device when determining that an uplink transmission waveform of the terminal device need to be modified. The network device may determine the waveform of the uplink transmission signal of the terminal device in a periodical or triggered manner. For example, the network device may measure an uplink reference signal sent by the terminal device, and determine a target uplink transmission waveform of the terminal device from at least two selectable uplink waveforms according to the measurement result. As an optional example, if the measurement result indicates that the terminal device is currently in an edge area of a cell, for example, the measurement result indicates that a signal reception strength or quality of the uplink reference signal is lower than a preset threshold, or that path loss of the uplink reference signal is higher than a preset threshold, the network device may determine that the target uplink transmission waveform of the terminal device is DFT-s-OFDM. If the measurement result indicates that the terminal device is currently in a center area of the cell, for example, the measurement result indicates that the signal reception strength or quality of the uplink reference signal is higher than the preset threshold, or that the path loss of the uplink reference signal is lower than the preset threshold, the network device may determine that the target uplink transmission waveform of the terminal device is OFDM. Optionally, if the determined target uplink transmission waveform is different from the current uplink transmission waveform of the terminal device, the network device may determine that the uplink transmission waveform of the terminal device needs to be modified and send the physical-layer signaling to the terminal device. Or, the network device may send the physical-layer signaling to the terminal device upon receiving a waveform change request sent by the terminal device. Or, the network device may send the physical-layer signaling to the terminal device in other scenarios where it is determined that current configuration of the first uplink transmission is inappropriate. Embodiments of the present disclosure do not limit trigger conditions for the network device to send the physical-layer signaling.

The network device may abandon or suspend the scheduling of the first uplink transmission or modify original configuration of the first uplink transmission by sending the physical-layer signaling to the terminal device. Optionally, the physical-layer signaling may specifically be DCI or other forms, but embodiments of the present disclosure are not limited thereto.

As an optional embodiment, if the physical-layer signaling is used for modifying original configuration of the first uplink transmission, the physical-layer signaling may further be used for indicating modified configuration of the first uplink transmission. Optionally, the physical-layer signaling may carry a modified configuration parameter of the first uplink transmission, such as a modified waveform, a modified MCS, a modified transmission resource, or a modified parameter for beamforming, or any combination of the above modified parameters, which are not limited by the embodiments of the present disclosure.

As another optional embodiment, if the first indication information is used for scheduling the transmission on the PUSCH of the terminal device, and the first indication information includes a HARQ process number of the PUSCH, then the physical-layer signaling may carry the HARQ process number of the PUSCH. Or, if the first indication information includes a UL process number used to identify the first uplink transmission, then the physical-layer signaling may carry the UL process number of the PUSCH, which is not limited by the embodiments of the present disclosure.

As another optional embodiment, if the physical-layer signaling is used to instruct the terminal device to suspend the first uplink transmission, the physical-layer signaling may further be used for configuring a timer for the terminal device, and the timer is used for the terminal device to detect a further indication of the first uplink transmission sent by the network device, and embodiments of the present disclosure are not limited thereto.

As another optional embodiment, the physical-layer signaling may implicitly instruct the terminal device to modify the configuration parameter of the first uplink transmission. For example, if the physical-layer signaling is specifically used for modifying a waveform of the first uplink transmission, the network device may send a high-layer signaling, such as a Radio Resource Control (RRC) signaling, to the terminal device before S210. The high-layer signaling carries a configuration parameter corresponding to each of at least two selectable uplink waveforms supported by the terminal device, and the at least two selectable uplink waveforms include a modified waveform of the first uplink transmission. For example, the network device may configure uplink transmission parameters based on each of the at least two selectable uplink waveforms, including transmission resources, channel parameters, etc. In this case, the network device may carry or indicate a configuration parameter corresponding to the modified waveform in the physical-layer signaling. Accordingly, the terminal device may determine to use the modified waveform to perform the first uplink transmission according to the configuration parameter carried or indicated in the physical-layer signaling, and embodiments of the present disclosure are not limited thereto.

As another optional embodiment, the physical-layer signaling may further be used for new scheduling, for example, the physical-layer signaling may further be used for scheduling second uplink transmission of the terminal device, so that the terminal device may perform the second uplink transmission according to the physical-layer signaling, and embodiments of the present disclosure are not limited thereto.

In S230, after receiving the physical-layer signaling, the terminal device may perform processing on the first uplink transmission according to the physical-layer signaling.

As an optional embodiment, the terminal device may abandon or suspend the first uplink transmission according to the indication of the physical-layer signaling, or perform the first uplink transmission according to the configuration indicated by the physical-layer signaling. For example, if the terminal device has not completed the first uplink transmission when receiving the physical-layer signaling, i.e., the terminal device has not sent a PUSCH, an uplink reference signal, or a PUCCH corresponding to the first uplink transmission, the terminal device may perform the processing on the scheduling of the first indication information according to the indication of the physical-layer signaling.

Specifically, if the physical-layer signaling is used for canceling the scheduling of the first uplink transmission, the terminal device may abandon the first uplink transmission according to the indication of the physical-layer signaling, such as, releasing a buffer corresponding to the first uplink transmission, and optionally, may abandon uplink data or information corresponding to the first uplink transmission. Or, if the physical-layer signaling is used for suspending the scheduling of the first uplink transmission, the terminal device may suspend the first uplink transmission according to the indication of the physical-layer signaling, for example, the terminal device suspends the processing of the PUSCH, the uplink reference signal, or the PUCCH corresponding to the first uplink transmission, and may not release the corresponding buffer. Or, if the physical-layer signaling is used for modifying configuration of the first uplink transmission, the terminal device may use modified configuration to perform the first uplink transmission according to the indication of the physical-layer signaling, which is not limited by the embodiments of the present disclosure.

Optionally, if the physical-layer signaling is used for instructing the terminal device to suspend the first uplink transmission, the terminal device may start a timer upon receiving the physical-layer signaling. Herein the timer may be specified by a protocol, or pre-configured by a network device through a high-layer signaling, or configured by the network device through the physical-layer signaling, which is not limited by embodiments of the present disclosure. Optionally, if the terminal device receives a further indication of the network device before the timer expires, for example, receiving second indication information sent by the network device, and the further indication specifically instructs the terminal device to continue to perform the first uplink transmission, or instructs the terminal device to abandon the first uplink transmission, or instructs the terminal device to perform the first uplink transmission in a modified configuration, the terminal device may perform the processing on the first uplink transmission according to the second indication information. Optionally, if the terminal device does not receive a further indication of the network device when the timer expires, the first uplink transmission may be discarded, and embodiments of the present disclosure are not limited thereto.

As another optional embodiment, if the terminal device has completed the first uplink transmission when receiving the physical-layer signaling, i.e., the terminal device has sent data or information corresponding to the first uplink transmission, the terminal device may ignore the physical-layer signaling, i.e., discard the physical-layer signaling, and embodiments of the present disclosure are not limited thereto.

As another optional embodiment, if the physical-layer signaling carries a HARQ process number or other information used for identifying uplink scheduling, the terminal device may search for uplink scheduling corresponding to the physical-layer signaling according to the HARQ process number or the other identification information. Optionally, if the terminal device searches out the uplink scheduling corresponding to the physical-layer signaling, the terminal device may perform processing on the corresponding uplink scheduling according to the indication of the physical-layer signaling. Optionally, if the terminal device does not search out the uplink schedule corresponding to the physical-layer signaling, for example, the terminal device does not receive the above-mentioned first indication information, the terminal device may ignore the physical-layer signaling, and embodiments of the present disclosure are not limited thereto.

Optionally, after S220, the network device may continue to perform detection on a transmission resource scheduled by the first indication information, i.e., perform detection on an initial transmission resource of the first uplink transmission. If the network device detects uplink transmission, the network device may perform demodulation processing on the detected uplink transmission. If the demodulation is performed successfully, the network device may determine that the data or information corresponding to the first uplink transmission is correctly received, i.e., it is determined that the first uplink transmission is completed, and the embodiments of the present disclosure are not limited thereto.

Therefore, in the communication method of the embodiments of the present disclosure, the network device sends the physical-layer signaling to the terminal device after sending the first indication information for scheduling the first uplink transmission, and the physical-layer signaling is used for instructing the terminal device to abandon or suspend the first uplink transmission, or the physical-layer signaling is used for modifying the configuration parameter of the first uplink transmission; the terminal device performs the processing on the first uplink transmission according to the physical-layer signaling. Hence when the network device finds that the original scheduling is inappropriate, for example, a burst service with a high priority occurs, or the waveform of the uplink transmission of the terminal device needs to be modified, the original scheduling can be immediately adjusted, thereby reducing the risk of packet loss and improving the user experience.

It should be understood that the values of the sequence numbers of the above-described processes do not imply the order of execution, and the order of execution of each process should be determined by the function and internal logic of each process. The sequence numbers of the above-described processes should not constitute any limitation on the implementation processes of the embodiments of the present disclosure.

Figure 3:
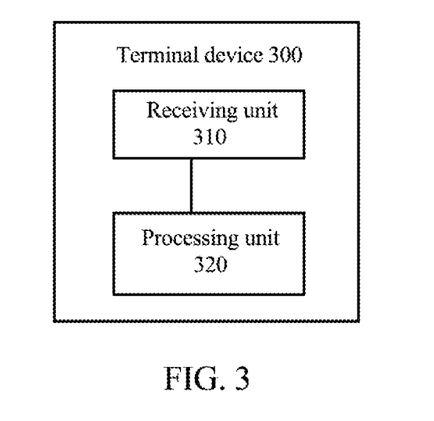
FIG. 3 is a block diagram of a terminal device according to an embodiment of the present disclosure.

FIG. 3 schematically shows a terminal device 300 according to an embodiment of the present disclosure. The terminal device 300 includes a receiving unit 310 and a processing unit 320.

The receiving unit 310 is used for receiving first indication information sent by a network device, and receiving a physical-layer signaling sent by the network device. The first indication information is used for scheduling first uplink transmission of the terminal device, the physical-layer signaling is used for instructing the terminal device to abandon or suspend the first uplink transmission, or the physical-layer signaling is used for modifying a configuration parameter of the first uplink transmission.

The processing unit 320 is used for performing processing on the first uplink transmission according to the physical-layer signaling received by the receiving unit 310.

Optionally, the processing unit 320 is specifically used for, if the first uplink transmission is not completed when the receiving unit 310 receives the physical-layer signaling, performing the processing on the first uplink transmission according to the physical-layer signaling.

Optionally, the processing unit 320 is further used for, if the first uplink transmission is completed when the receiving unit 310 receives the physical-layer signaling, discarding the physical-layer signaling.

Optionally, the physical-layer signaling is used for instructing the terminal device to suspend the first uplink transmission. The receiving unit 310 is further used for receiving second indication information sent by the network device after the processing unit 320 performs the processing on the first uplink transmission according to the physical-layer signaling received by the receiving unit 310. The second indication information is used for instructing the terminal device to abandon the first uplink transmission or continue to perform the first uplink transmission, or instructing the terminal device to use a new configuration parameter to perform the first uplink transmission. Correspondingly, the processing unit 320 is further used for performing processing on the first uplink transmission according to the second indication information received by the receiving unit 310.

Optionally, the processing unit 320 is further used for starting a timer when determining that the physical-layer signaling is used for instructing the terminal device to suspend the first uplink transmission. Accordingly, the receiving unit 310 is specifically used for receiving the second indication information sent by the network device before the timer started by the processing unit 320 expires.

Optionally, the processing unit 320 is further used for, if the second indication information sent by the network device is not received before the timer expires, discarding the first uplink transmission. Optionally, the physical-layer signaling is specifically used for modifying at least one of following configuration parameters of the first uplink transmission: a waveform, a transmission resource, a Modulation Coding Scheme (MCS), and a parameter for beamforming.

Optionally, the receiving unit 310 is further used for, when the physical-layer signaling is specifically used for modifying a waveform of the first uplink transmission, receiving a high-layer signaling sent by the network device before receiving the physical-layer signaling sent by the network device. The high-layer signaling carries a configuration parameter corresponding to each of at least two selectable uplink waveforms supported by the terminal device, and the at least two selectable uplink waveforms include a modified waveform of the first uplink transmission.

Optionally, the physical-layer signaling includes a configuration parameter corresponding to a modified waveform carried by the high-layer signaling. Correspondingly, the processing unit 320 is further used for determining to use the modified waveform for the first uplink transmission according to the configuration parameter carried by the physical-layer signaling received by the receiving unit 310.

Optionally, the receiving unit 310 is specifically used for receiving the physical-layer signaling sent by the network device when the network device determines that an uplink transmission waveform of the terminal device need to be modified.

Optionally, the first uplink transmission includes at least one of: transmission on a Physical Uplink Shared Channel (PUSCH), transmission of an uplink reference signal, and transmission on a Physical Uplink Control Channel (PUCCH).

Optionally, if the first uplink transmission includes the transmission on the PUSCH, and the first indication information includes an uplink transmission number corresponding to the first uplink transmission.

In this case, optionally, the physical-layer signaling carries an uplink transmission number corresponding to the first uplink transmission. Correspondingly, the processing unit 320 is further used for determining that the physical-layer signaling corresponds to the first uplink transmission according to the uplink transmission number carried by the physical-layer signaling received by the receiving unit 310.

Optionally, the physical-layer signaling is further used for scheduling second uplink transmission of the terminal device. Correspondingly, the processing unit 320 is also used for performing the second uplink transmission according to the physical-layer signaling.

It should be understood that, the terminal device 300 herein is shown in the form of functional units. The term "unit" herein may refer to an Application Specific Integrated Circuit (ASIC), an electronic circuit, a processor (e.g., a shared processor, proprietary processor or group processor, etc.) for executing one or more software or firmware programs, a storage, a combinational logic circuit, and/or other appropriate components that support the described functions. In an optional example, those skilled in the art can understand that the terminal device 300 may be specifically the terminal device in the above method embodiments, and the terminal device 300 may be used for executing various processes and/or steps corresponding to the terminal device in the above method embodiments, which will not be described here in detail to avoid repetition.

Figure 4:
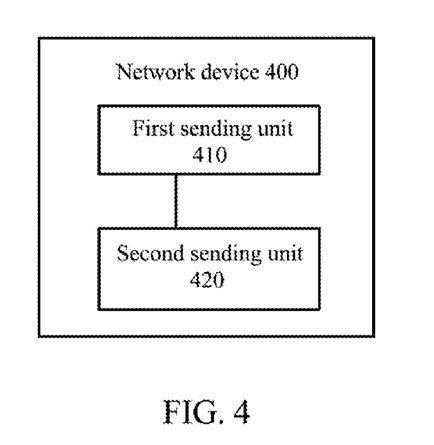
FIG. 4 is a block diagram of a network device according to an embodiment of the present disclosure.

FIG. 4 schematically shows a network device 400 according to an embodiment of the present disclosure. The network device 400 includes a first sending unit 410 and a second sending unit 420.

The first sending unit 410 is used for sending first indication information to a terminal device, and the first indication information is used for scheduling first uplink transmission of the terminal device.

The second sending unit 420 is used for sending a physical-layer signaling to the terminal device. The physical-layer signaling is used for instructing the terminal device to abandon or suspend the first uplink transmission, or the physical-layer signaling is used for modifying a configuration parameter of the first uplink transmission.

Optionally, the network device 400 further includes a detection unit.

The detection unit is used for performing detection on a transmission resource scheduled by the first indication information after the second sending unit 420 sends the physical-layer signaling to the terminal device.

The processing unit is used for, if the detection unit detects an uplink transmission on the transmission resource, performing demodulation processing on the detected uplink transmission.

Optionally, the processing unit is further used for, if the processing unit successfully demodulates the detected uplink transmission, determining that the first uplink transmission is successful.

Optionally, the physical-layer signaling is used for instructing the terminal device to suspend the first uplink transmission. In this case, the second sending unit 420 is further used for sending second indication information to the terminal device after sending the physical-layer signaling to the terminal device. The second indication information is used for instructing the terminal device to abandon the first uplink transmission or continue to perform the first uplink transmission, or instructing the terminal device to use a modified configuration parameter to perform the first uplink transmission.

Optionally, the second sending unit 420 is further used for, before sending the second indication information to the terminal device, sending third indication information to the terminal device. The third indication information is used for configuring a timer for the suspension of the uplink transmission of the terminal device.

Accordingly, sending, by the second sending unit 420, the second indication information to the terminal device includes: the second sending unit 420 sends the second indication information to the terminal device before the timer expires.

Optionally, the physical-layer signaling is specifically used for modifying at least one of the following configuration parameters of the first uplink transmission: a waveform, a transmission resource, a Modulation Coding Scheme (MCS), and a parameter for beamforming.

Optionally, the second sending unit 420 is further used for, if the physical-layer signaling is specifically used for modifying a waveform of the first uplink transmission, sending a high-layer signaling to the terminal device before sending the physical-layer signaling to the terminal device. The high-layer signaling carries a configuration parameter corresponding to each of at least two selectable uplink waveforms supported by the terminal device, and the at least two selectable uplink waveforms include a modified waveform of the first uplink transmission.

Correspondingly, the physical-layer signaling includes a configuration parameter corresponding to the modified waveform carried by the high-layer signaling.

Optionally, the second sending unit 420 is specifically used for sending the physical-layer signaling to the terminal device when determining that the uplink transmission waveform of the terminal device needs to be modified.

As an optional embodiment, the network device 400 further includes a measuring unit and a determination unit.

The measurement unit is used for measuring an uplink reference signal sent by the terminal device.

The determination unit is used for determining an uplink transmission waveform of the terminal device according to the measurement result of the measurement unit.

In this case, the second sending unit 420 is specifically used for sending the physical-layer signaling to the terminal device when the uplink transmission waveform determined by the determining unit is different from a current uplink transmission waveform of the terminal device.

As an optional example, the determination unit is specifically used for: if the measurement result of the measurement unit indicates that the terminal device is currently in a center area of a cell, determining the uplink transmission waveform of the terminal device to be OFDM; and/or if the measurement result of the measurement unit indicates that the terminal device is currently in an edge area of the cell, determining the uplink transmission waveform of the terminal device to be DFT-s-OFDM.

Optionally, the first uplink transmission includes at least one of: transmission on a Physical Uplink Shared Channel (PUSCH), transmission of an uplink reference signal, and transmission on a Physical Uplink Control Channel (PUCCH).

Optionally, if the first uplink transmission includes the transmission on the PUSCH, the first indication information includes an uplink transmission number corresponding to the first uplink transmission. Correspondingly, the physical-layer signaling carries the uplink transmission number corresponding to the first uplink transmission.

Optionally, the physical-layer signaling is further used for scheduling second uplink transmission of the terminal device.

It should be understood that the network device 400 herein is shown in the form of functional units. The term "unit" herein may refer to an Application Specific Integrated Circuit (ASIC), an electronic circuit, a processor (e.g., a shared processor, proprietary processor or group processor, etc.), for executing one or more software or firmware programs, a storage, a combinational logic circuit, and/or other appropriate components that support the described functions. In an alternative example, those skilled in the art can understand that the network device 400 may be specifically the network device in the above method embodiments, and the network device 400 may be used for executing various processes and/or steps corresponding to the network device in the above method embodiments, which will not be described here in detail to avoid repetition.

Figure 5:
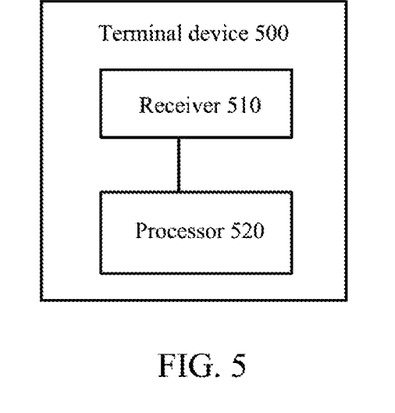
FIG. 5 is a block diagram of another terminal device according to an embodiment of the present disclosure.

FIG. 5 schematically shows a terminal device 500 according to an embodiment of the present disclosure. The terminal device 500 includes a receiver 510 and a processor 520.

The receiver 510 is used for receiving first indication information sent by a network device, and receiving a physical-layer signaling sent by the network device. The first indication information is used for scheduling first uplink transmission of the terminal device. The physical-layer signaling is used for instructing the terminal device to abandon or suspend the first uplink transmission, or the physical-layer signaling is used for modifying a configuration parameter of the first uplink transmission.

The processor 520 is used for performing processing on the first uplink transmission according to the physical-layer signaling received by the receiver 510.

Optionally, the processor 520 is specifically used for, if the first uplink transmission is not completed when the receiver 510 receives the physical-layer signaling, performing the processing on the first uplink transmission according to the physical-layer signaling.

Optionally, the processor 520 is further used for, if the first uplink transmission is completed when the receiver 510 receives the physical-layer signaling, discarding the physical-layer signaling.

Optionally, the physical-layer signaling is used for instructing the terminal device to suspend the first uplink transmission. In this case, the receiver 510 is further used for receiving second indication information sent by the network device after the processor 520 performs the processing on the first uplink transmission according to the physical-layer signaling received by the receiver 510. The second indication information is used for instructing the terminal device to abandon the first uplink transmission or continue to perform the first uplink transmission, or instructing the terminal device to adopt a new configuration parameter to perform the first uplink transmission. Correspondingly, the processor 520 is further used for performing processing on the first uplink transmission according to the second indication information received by the receiver 510.

Optionally, the processor 520 is further used for starting a timer when determining that the physical-layer signaling is used for instructing the terminal device to suspend the first uplink transmission. Accordingly, the receiver 510 is specifically used for receiving the second indication information sent by the network device before the timer started by the processor 520 expires.

Optionally, the processor 520 is further used for, if the second indication information sent by the network device is not received before the timer expires, discarding the first uplink transmission.

Optionally, the physical-layer signaling is specifically used for modifying at least one of following configuration parameters of the first uplink transmission: a waveform, a transmission resource, a Modulation Coding Scheme (MCS), and a parameter for beamforming.

Optionally, the receiver 510 is further used for, when the physical-layer signaling is specifically used for modifying a waveform of the first uplink transmission, receiving a high-layer signaling sent by the network device before receiving the physical-layer signaling sent by the network device. The high-layer signaling carries a configuration parameter corresponding to each of at least two selectable uplink waveforms supported by the terminal device, and the at least two selectable uplink waveforms include a modified waveform of the first uplink transmission.

In this case, optionally, the physical-layer signaling includes a configuration parameter corresponding to the modified waveform carried by the high-layer signaling. Correspondingly, the processing unit 520 is further used for determining to use the modified waveform to perform the first uplink transmission according to the configuration parameter carried by the physical-layer signaling received by the receiving unit 510.

Optionally, the receiving unit 510 is specifically used for receiving the physical-layer signaling sent by the network device when the network device determines that uplink transmission waveform of the terminal device needs to be modified.

Optionally, the first uplink transmission includes at least one of: transmission on a Physical Uplink Shared Channel (PUSCH), transmission of an uplink reference signal, and transmission on a Physical Uplink Control Channel (PUCCH).

Optionally, if the first uplink transmission includes the transmission on the PUSCH, the first indication information includes an uplink transmission number corresponding to the first uplink transmission.

In this case, optionally, the physical-layer signaling carries the uplink transmission number corresponding to the first uplink transmission. Correspondingly, the processing unit 520 is further used for determining that the physical-layer signaling corresponds to the first uplink transmission according to the uplink transmission number carried by the physical-layer signaling received by the receiving unit 510.

Optionally, the physical-layer signaling is further used for scheduling second uplink transmission of the terminal device. Correspondingly, the processor 520 is further used for performing the second uplink transmission according to the physical-layer signaling.

It should be understood that the terminal device 500 herein may be specifically the terminal device in the above-described embodiments, and may be used for executing various steps and/or processes corresponding to the terminal device in the above-described method embodiments.

Optionally, the terminal device 500 may further include a storage which may include a read-only memory and a random access memory, and provides instructions and data to the processor. A portion of the storage may also include a non-volatile random access memory. For example, the storage may further store device type information. The processor 520 may be used for executing instructions stored in the storage, and when the processor executes the instructions, the processor may performs various steps corresponding to the terminal device in the above method embodiments.

Figure 6:
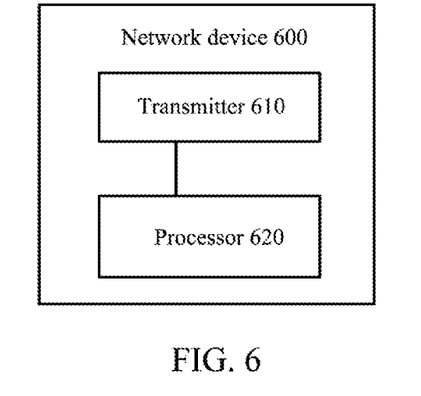
FIG. 6 is a block diagram of a network device according to an embodiment of the present disclosure.

FIG. 6 schematically shows a network device 600 according to an embodiment of the present disclosure. The computer device 600 includes a transmitter 610 and a processor 620.

The transmitter 610 is used for sending first indication information to a terminal device and sending a physical-layer signaling to the terminal device. The first indication information is used for scheduling first uplink transmission of the terminal device, and the physical-layer signaling is used for instructing the terminal device to abandon or suspend the first uplink transmission, or the physical-layer signaling is used for modifying a configuration parameter of the first uplink transmission.

Optionally, the processor 620 is used for performing detection on a transmission resource scheduled by the first indication information after the transmitter 610 sends a physical-layer signaling to the terminal device, and performing demodulation processing on the detected uplink transmission if the uplink transmission is detected on the transmission resource.

Optionally, the processor 620 is further used for determining that the first uplink transmission is successful when the detected uplink transmission is successfully demodulated.

Optionally, the physical-layer signaling is used for instructing the terminal device to suspend the first uplink transmission. At this time, the transmitter 610 is further used for sending second indication information to the terminal device after sending physical-layer signaling to the terminal device. The second indication information is used for instructing the terminal device to abandon the first uplink transmission or continue to perform the first uplink transmission, or instructing the terminal device to use a modified configuration parameter to perform the first uplink transmission.

Optionally, the transmitter 610 is further used for sending third indication information to the terminal device before sending the second indication information to the terminal device. The third indication information is used for configuring a timer for the suspension of the uplink transmission of the terminal device.

Accordingly, sending, by the transmitter 610, the second indication information to the terminal device, includes: the transmitter 610 sends the second indication information to the terminal device before the timer expires.

Optionally, the physical-layer signaling is specifically used for modifying at least one of following configuration parameters of the first uplink transmission: a waveform, a transmission resource, a Modulation Coding Scheme (MCS), and a parameter for beamforming.

Optionally, the transmitter 610 is further used for: if the physical-layer signaling is specifically used for modifying a waveform of the first uplink transmission, sending a high-layer signaling to the terminal device before sending the physical-layer signaling. The high-layer signaling carries a configuration parameters corresponding to each of at least two selectable uplink waveforms supported by the terminal device, and the at least two selectable waveforms includes a modified waveform of the first uplink transmission.

Correspondingly, the physical-layer signaling includes the configuration parameter corresponding to the modified waveform carried by the high-layer signaling.

Optionally, the transmitter 610 is specifically used for sending the physical-layer signaling to the terminal device when the processor 620 determines that the uplink transmission waveform of the terminal device needs to be modified.

As an optional embodiment, the processor 620 is used for measuring the uplink reference signal sent by the terminal device and determining the uplink transmission waveform of the terminal device according to the of the measurement result.

The processor 620 is specifically used for determining that an uplink transmission waveform of the terminal device needs to be modified when a determined uplink transmission waveform is different from a current uplink transmission waveform of the terminal device.

In this case, the transmitter 610 is specifically used for sending the physical-layer signaling to the terminal device when the uplink transmission waveform determined by the processor 620 is different from the current uplink transmission waveform of the terminal device.

As an optional example, the processor 620 is specifically used for: if the measurement result indicates that the terminal device is currently in a center area of a cell, determining the uplink transmission waveform of the terminal device to be OFDM; and/or if the measurement result indicates that the terminal device is currently in an edge area of the cell, determining the uplink transmission waveform of the terminal device to be DFT-s-OFDM.

Optionally, the first uplink transmission includes at least one of: transmission on a Physical Uplink Shared Channel (PUSCH), transmission of an uplink reference signal, and transmission on a Physical Uplink Control Channel (PUCCH).

Optionally, if the first uplink transmission includes the transmission on the PUSCH, the first indication information includes an uplink transmission number corresponding to the first uplink transmission. Correspondingly, the physical-layer signaling carries the uplink transmission number corresponding to the first uplink transmission.

Optionally, the physical-layer signaling is further used for scheduling second uplink transmission of the terminal device.

It should be understood that the network device 600 herein may be specifically the network device in the above-described embodiments, and may be configured to execute various steps and/or processes corresponding to the network device in the above-described method embodiments.

Optionally, the network device 600 may further include a storage which may include a read-only memory and a random access memory, and provides instructions and data to the processor. A portion of the storage may also include a non-volatile random access memory. For example, the storage may further store device type information. The processor 620 may be used for executing instructions stored in the storage, and when the processor executes the instructions, the processor may perform various steps corresponding to the terminal device in the above method embodiments.

Those of ordinary skill in the art can understand that the method steps and units described in the embodiments disclosed herein can be implemented in electronic hardware, computer software, or a combination of the electronic hardware and computer software. To clearly illustrate the interchangeability of hardware and software, the steps and components in the embodiments have been described generally according to functions in the above description. Whether these functions are implemented in hardware or software depends on the particular application and design constraints of the technical solution. Those of ordinary skill in the art may use different methods to implement the described functions for each particular application, but such implementation should not be considered to be beyond the scope of the present disclosure.

Those skilled in the art can clearly understand that for convenience and conciseness of description, the specific working processes of the system, device and unit described above may refer to the corresponding processes in the aforementioned method embodiments and will not be described here.

In several embodiments provided by the present application, it should be understood that the disclosed systems, devices and methods may be implemented in other ways. For example, the device embodiments described above are only illustrative, for example, the division of the units is only a logical function division, and there may be other division manners in actual implementation, for example, multiple units or components may be combined or integrated into another system, or some features may be ignored or not executed. In addition, the mutual coupling or direct coupling or communication connection shown or discussed may be indirect coupling or communication connection through some interface, device or unit, and may be a connection in electrical, mechanical or other form.

The unit described as a separate unit may or may not be physically separated, and the part shown as a unit may or may not be a physical unit, i.e., it may be located in one place or may be distributed over multiple network units. Some or all of the units may be selected according to actual needs to achieve the purpose of the solutions in the embodiments of the present disclosure.

In addition, various functional units in various embodiments of the present disclosure may be integrated in one processing unit, or the various units may be physically present separately, or two or more units may be integrated in one unit. The integrated unit may be implemented in the form of hardware or software functional modules.

The integrated units may be stored in a computer readable storage medium if implemented in the form of software functional units and sold or used as separate products. Based on such understanding, the technical solution of the present disclosure, in essence, or the part contributing to the prior art, or all or a part of the technical solution, may be embodied in the form of a software product. The software product is stored in a storage medium and includes a number of instructions for causing a computer device (which may be a personal computer, a server, or a network device, etc.) to implement all or part of the steps of the method described in various embodiments of the present disclosure. The aforementioned storage medium includes various media capable of storing program code, such as a U disk, a mobile hard disk, a read-only memory (ROM), a random access memory (RAM), a magnetic disk, or an optical disk.

The foregoing is only specific embodiments of the present disclosure, but the scope of protection of the present disclosure is not limited thereto. Various equivalent variations or substitutions, which may easily be conceived within the technical scope disclosed by the present disclosure by any person skilled in the art, shall fall within the scope of protection of the present disclosure. Therefore, the scope of protection of the present disclosure should be subject to the scope of protection of the claims.

What is claimed is:

1. A communication method, comprising:
   receiving, by a terminal device, first indication information sent by a network device, wherein the first indication information is used for scheduling first uplink transmission of the terminal device;
   receiving, by the terminal device, a physical-layer signaling sent by the network device, wherein the physical-layer signaling is used for instructing the terminal device to abandon the first uplink transmission; and
   abandoning, by the terminal device, the first uplink transmission according to the physical-layer signaling, comprising:
   based on a determination that the terminal device has not completed the first uplink transmission when receiving the physical-layer signaling, abandoning, by the terminal device, the first uplink transmission according to the physical-layer signaling.

2. The method of claim 1, wherein the method further comprises:
   based on a determination that the terminal device has completed the first uplink transmission when receiving the physical-layer signaling, discarding, by the terminal device, the physical-layer signaling.

3. The method of claim 1, wherein the physical-layer signaling is used for instructing the terminal device to suspend the first uplink transmission, and the method comprises:
   after the terminal device suspends the first uplink transmission according to the physical-layer signaling:
   receiving, by the terminal device, second indication information sent by the network device, wherein the second indication information is used for instructing the terminal device to abandon the first uplink transmission or continue to abandon the first uplink transmission, or instructing the terminal device to use a new configuration parameter to abandon the first uplink transmission; and
   abandoning, by the terminal device, the first uplink transmission according to the second indication information.

4. The method of claim 3, wherein the method further comprises:

starting, by the terminal device, a timer when determining that the physical-layer signaling is used for instructing the terminal device to suspend the first uplink transmission;

wherein receiving, by the terminal device, the second indication information sent by the network device comprises:

receiving, by the terminal device, the second indication information sent by the network device before the timer expires.

5. The method of claim 4, wherein the method further comprises:

based on a determination that the terminal device does not receive the second indication information sent by the network device before the timer expires, abandoning, by the terminal device, the first uplink transmission.

6. The method of claim 1, wherein the physical-layer signaling is further used for modifying at least one of following configuration parameters of the first uplink transmission: a waveform, a transmission resource, a Modulation Coding Scheme (MCS), and a parameter for beamforming.

7. The method of claim 5, wherein the method further comprises:

before the terminal device receives the physical-layer signaling sent by the network based device:
based on a determination that the physical-layer signaling is used for modifying a waveform of the first uplink transmission, receiving, by the terminal device, a high-layer signaling sent by the network device, wherein the high-layer signaling carries a configuration parameter corresponding to each of at least two selectable uplink waveforms supported by the terminal device, and the at least two selectable uplink waveforms comprise a modified waveform of the first uplink transmission, wherein
the physical-layer signaling comprises a configuration parameter corresponding to the modified waveform carried by the high-layer signaling; and
after the terminal device receives the physical-layer signaling sent by the network device:
determining, by the terminal device, to use the modified waveform to perform the first uplink transmission according to the configuration parameter carried by the physical-layer signaling.

8. The method of claim 1, wherein receiving, by the terminal device, the physical-layer signaling sent by the network device comprises:

receiving, by the terminal device, the physical-layer signaling sent by the network device when the network device determines that an uplink transmission waveform of the terminal device needs to be modified.

9. The method of claim 1, wherein the first uplink transmission includes at least one of: transmission on a Physical Uplink Shared Channel (PUSCH), transmission of an uplink reference signal, and transmission on a Physical Uplink Control Channel (PUCCH).

10. The method of claim 1, wherein when the first uplink transmission comprises transmission on a PUSCH, the first indication information comprises an uplink transmission number corresponding to the first uplink transmission;

the physical-layer signaling carries the uplink transmission number corresponding to the first uplink transmission;

wherein after the terminal device receives the physical-layer signaling sent by the network device, the method further comprises:

determining, by the terminal device, that the physical-layer signaling corresponds to the first uplink transmission according to the uplink transmission number carried by the physical-layer signaling.

11. The method of claim 1, wherein the physical-layer signaling is further used for scheduling second uplink transmission of the terminal device; and the method further comprises:
performing the second uplink transmission according to the physical-layer signaling.

12. A terminal device, comprising:

a receiver used for receiving first indication information sent by a network device, and receive a physical-layer signaling sent by the network device, wherein the first indication information is used for scheduling first uplink transmission of the terminal device, and the physical-layer signaling is used for instructing the terminal device to abandon the first uplink transmission; and a processor used for abandoning the first uplink transmission according to the physical-layer signaling received by the receiver, comprising:
if the first uplink transmission is not completed when the receiver receives the physical-layer signaling, abandoning the first uplink transmission according to the physical-layer signaling.

13. The terminal device of claim 12, wherein the processor is further used for, if the first uplink transmission is completed when the receiver receives the physical-layer signaling, discarding, the physical-layer signaling.

14. The terminal device of claim 12, wherein the physical-layer signaling is used for instructing the terminal device to suspend the first uplink transmission;

the receiver is further used for receiving second indication information sent by the network device after the processor suspends the first uplink transmission according to the physical-layer signaling received by the receiver, wherein the second indication information is used for instructing the terminal device to abandon the first uplink transmission or continue to abandon the first uplink transmission, or instructing the terminal device to use a new configuration parameter to perform the first uplink transmission; and the processor is further used for abandoning the first uplink transmission according to the second indication information received by the receiver.

15. The terminal device of claim 14, wherein the processor is further used for starting a timer when determining that the physical-layer signaling is used for instructing the terminal device to suspend the first uplink transmission; and the receiver is further used for receiving the second indication information sent by the network device before the timer started by the processor expires.

16. The terminal device of claim 15, wherein the processor is further used for abandoning the first uplink transmission when the second indication information sent by the network device is not received before the timer expires.

17. The terminal device of claim 12, wherein the physical-layer signaling is further used for modifying at least one of following configuration parameters of the first uplink transmission: a waveform, a transmission resource, a Modulation Coding Scheme (MCS), and a parameter for beamforming.

* * * * *